(12) United States Patent
Forbert et al.

(10) Patent No.: US 6,415,993 B1
(45) Date of Patent: Jul. 9, 2002

(54) DEVICE FOR THE MIXING AND SUBSEQUENT ATOMIZING OF LIQUIDS

(75) Inventors: Rainald Forbert, Flörsheim; Johannes Hartel, Bad Soden; Wilfried Schierholz, Hocheim, all of (DE)

(73) Assignee: Axiva GmbH (DE)

( * ) Notice: Subject to any disclaimer, the term of this patent is extended or adjusted under 35 U.S.C. 154(b) by 0 days.

(21) Appl. No.: 09/582,737
(22) PCT Filed: Nov. 19, 1998
(86) PCT No.: PCT/EP98/07438
§ 371 (c)(1),
(2), (4) Date: Jun. 27, 2000
(87) PCT Pub. No.: WO99/33554
PCT Pub. Date: Jul. 8, 1999

Related U.S. Application Data
(60) Provisional application No. 60/099,849, filed on Sep. 11, 1998.

(30) Foreign Application Priority Data

Dec. 29, 1997 (DE) .......................... 197 57 795

(51) Int. Cl.⁷ .............................. B05B 7/04; B05B 1/26
(52) U.S. Cl. .................. 239/434; 239/498; 239/518
(58) Field of Search .............................. 239/518, 398, 239/432, 433, 434, 590.5, 498, 504

(56) References Cited

U.S. PATENT DOCUMENTS

| | | | |
|---|---|---|---|
| 2,384,946 A | 9/1945 | Marisic | 252/235 |
| 3,640,472 A | 2/1972 | Hruby, Jr. et al. | 239/552 |
| 3,680,792 A | 8/1972 | Schott | 239/452 |
| 3,767,125 A | 10/1973 | Gehres et al. | 239/552 |
| 4,655,395 A * | 4/1987 | Cioffi et al. | 239/432 X |
| 4,828,182 A | 5/1989 | Haruch | 239/432 |
| 5,232,883 A | 8/1993 | Derleth et al. | 502/5 |
| 5,518,183 A | 5/1996 | Waldrum | 239/460 |

FOREIGN PATENT DOCUMENTS

| | | |
|---|---|---|
| DE | 2103243 | 8/1972 |
| DE | 2925435 | 1/1981 |
| EP | 0581720 | 2/1994 |

* cited by examiner

*Primary Examiner*—Lesley D. Morris
(74) *Attorney, Agent, or Firm*—Connolly Bove Lodge & Hutz LLP

(57) ABSTRACT

The invention relates to an apparatus for preparing a rapidly solidifying mixture from a plurality of liquid components and subsequent atomization of the solidifying mixture. The apparatus comprises a mixing chamber (4), a liquid distributor (1',7) and N identical, droplet-forming nozzles (9a,9b) connected to the liquid distributor. The liquids to be mixed can be fed separately to the mixing chamber and the mixing chamber has neither significant back-mixing in the areas in which reactions can occur, nor significant dead spaces in the flow in these areas. The liquid distributor (1',7) is connected to the mixing chamber and divides the mixed stream coming from the mixing chamber equally over the nozzles (9a,9b) without significant back-mixing or dead spaces in the flow, so that the flow properties of the partial streams and their residence time in the liquid distributor are identical.

24 Claims, 6 Drawing Sheets

Figure 1:
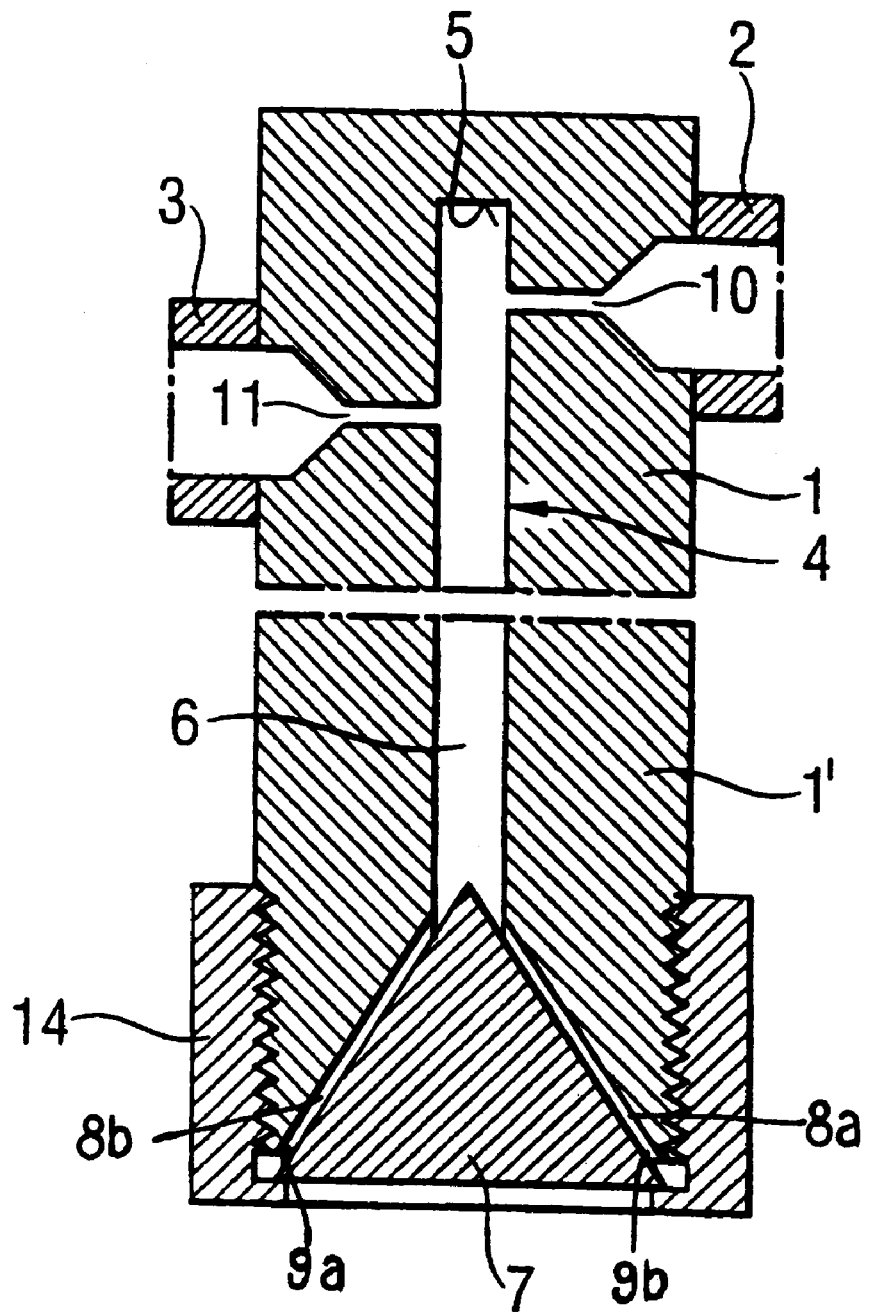

Fig. 4A
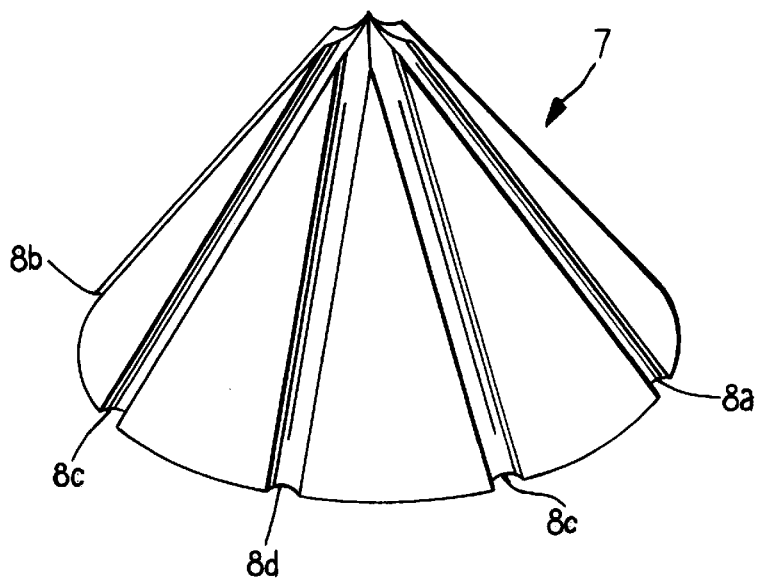
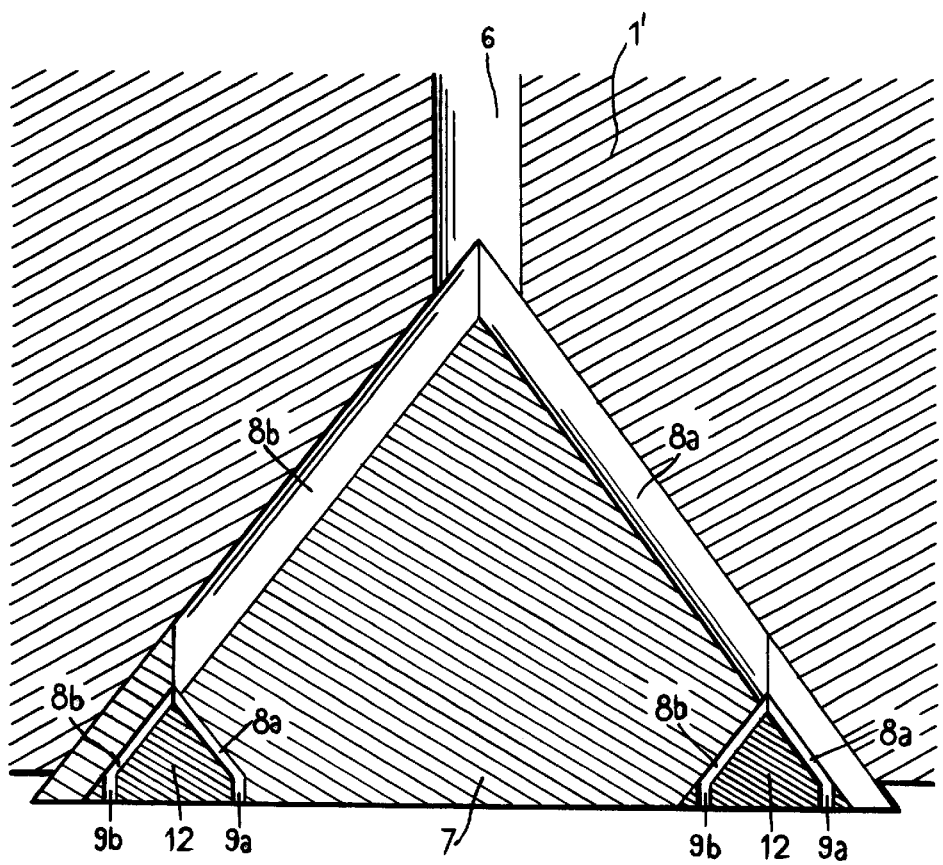
Fig. 6

DEVICE FOR THE MIXING AND SUBSEQUENT ATOMIZING OF LIQUIDS

This application is a 371 of PCT/EP98/07438 filed Nov. 19, 1998 which claims benefit of Provisional Application Ser. No. 60/099,849 filed Sep. 11, 1998.

The invention relates to an apparatus for preparing a rapidly solidifying mixture from a plurality of liquid components and subsequent atomization of the solidifying mixture.

In some areas of chemistry, the problem occurs that a mixture of low-viscosity liquids is to be used to form solids or gels as essential spherical particles.

The problems occurring, for example, in the preparation of hydrogels from water glass are discussed extensively in DE-A-2103243, for example. In general, the risk of formation of encrustation gives problems for many processes of achieving a stable mode of operation in production.

In DE-A-2103243, to prepare hydrogels, a process is used in which a rapidly solidifying mixture is first formed, in this case by gel formation, which is then, in the liquid state, directly atomized by a gaseous medium via a nozzle in a falling tower, the resulting droplets solidifying during the falling time. If, as in this case, solidification is performed chemically, it is necessary to mix the starting material streams rapidly as homogeneously as possible and to atomize them, so that the plant does not become blocked. However, the reaction in the droplets should have proceeded to approximately the same extent at a given height in the spraying tower, so that a product as uniform as possible is produced.

DE-A-2103243 discloses an apparatus for preparing hydrogels which features a mixing chamber which is preferably formed by a cylindrical tube, has, offset over its length, inlet orifices for the starting liquids, is closed at one end at its upstream end and whose downstream end ends in a nozzle outlet. In the apparatus, it is often important that back-mixing and edges are avoided in the mixing chamber. Owing to the fact that only one nozzle outlet is provided, either there can be only a very small throughput per mixing chamber or the nozzle, as in the example described in the abovementioned publication, must first produce a fan-shaped jet, for example, which then breaks down into droplets. The disadvantage of this process is either, in the first case, the low throughput of such a mixing and spraying apparatus or, in the second case, a relatively broad droplet radius distribution, which is disadvantageous for any subsequent processing steps. In addition, controlled change of the droplet size is difficult.

If, in particular, gel droplets are to be post-treated chemically, it is often of importance to obtain a narrow droplet radius distribution, since the time for diffusion into the droplets varies as the square of the droplet radius.

It is the object of the present invention, therefore, to provide an apparatus for preparing a rapidly solidifying mixture from a plurality of liquid components and subsequent atomization of the solidifying mixture which permits essentially spherical droplets having a narrow droplet radius distribution to be able to be produced on a large scale.

In addition, the apparatus is intended to produce droplets having material properties as identical as possible.

Furthermore, the apparatus is intended to be easily cleaned in the case that a blockage nevertheless occurs.

In addition, the apparatus is to readily permit change to other droplet radii.

The object is achieved by an apparatus for preparing a rapidly solidifying mixture from a plurality of liquid components and subsequent atomization of the solidifying mixture, wherein it comprises a liquid distributor and N droplet-forming nozzles which are connected to the liquid distributor, and wherein the liquid distributor is connected to the mixing chamber and distributes the mixed stream coming from the mixing chamber equally over the nozzles essentially without back-mixing or dead spaces in the flow, so that the residence times of the partial streams in the liquid distributor are essentially identical.

Mixing chamber, liquid distributor and nozzles are to be connected here in such a manner that as few edges as possible, which could give rise to encrustations, are formed. The fact that the liquid distributor has no significant back-mixing and no significant dead spaces ensures that no areas having solidified material and thus no blockages can form in the liquid distributor.

The residence times in the mixing chamber and in the liquid distributor must always correspond here to the time up to the solidification of the mixture. The dimensions of the apparatus are greatly dependent on the properties of the solidifying mixture. For each mixture component, at least one inlet orifice is provided, but a plurality of inlet orifices can also be used. The residence times in the apparatus after the addition of the last component necessary for a reaction must in any case be less than the solidification time. The size of the mixing chamber is then given by the preset: residence time in the apparatus and the required throughput. The number of nozzles is essentially a function of the throughput and the required droplet size which, at a given nozzle orifice, typically between 0.5 and 5 mm, is a function inter alia of the Reynolds number and surface a tension of the mixture at the moment of exit from the nozzle, and on the flow velocity. The nozzles must be arranged, that is their distance from one another and their direction must be selected, in such a manner that the resulting droplets after atomization do not collide and possibly form larger droplets.

In general, the apparatus is to be designed in such a manner that high flow velocities result, in order to prevent deposits on the apparatus walls.

Preferably, the nozzles produce the droplets by wavy sheet disintegration of an essentially laminar flow, since this can produce a very narrow droplet radius distribution. The conditions then to be imposed on the flow are to be taken into account during the design of the apparatus.

The advantage of the apparatus according to the invention is that, by using a liquid distributor which divides the solidifying mixture into N equal partial streams and passes them on to nozzles, and using droplet-forming nozzles, a high throughput and a narrow droplet radius distribution can be achieved simultaneously.

A further advantage is that, since the partial streams are taken off simultaneously from a relatively large mixed stream, the material properties of the droplets formed are virtually identical, so that the product formed is essentially more homogeneous than when it is produced by atomizing in a plurality of different mixing-spraying apparatuses.

A further advantage results from the fact that the residence times of the individual partial streams are identical, i.e. the residence time differences between the individual partial streams in the liquid distributor are substantially smaller than the time remaining up to a viscosity increase which is significant for the flow properties and thus the droplet formation, which leads to homogeneous product properties, i.e. identical properties of the solidifying mixtures at the individual nozzle orifices.

Preferably, the nozzles are identical; the liquid distributor is then preferably designed in such a manner that essentially identical flow properties (i.e. pressure, velocity, laminarity, etc.) prevail at the nozzles. Owing to the uniformity of flow properties at the identical nozzles, the droplet radius distributions of the individual nozzles are essentially identical, so that overall a particularly narrow droplet radius distribution can be achieved at high throughput.

The mixing chamber is preferably formed by a cylindrical tube having at least two inlet orifices displaced over its length, which tube is sealed at its upstream end. The distance between the inlet orifices in the direction of the tube axis is between 0 and 50 cm, preferably between 1 and 20 cm, particularly preferably between 2 and 5 cm.

This mixing chamber is very easy to manufacture and has virtually no back-mixing or dead spaces in the flow, which avoids areas of mixing in which the solidification is already further advanced; thus stable operation is ensured.

The mixing chamber, instead of a plurality of inlet orifices through which the same liquid is admitted, can alternatively have slots through which the liquid is admitted.

Preferably, in this mixing chamber, at least the uppermost inlet orifice runs tangentially to the tube wall and the inlet orifices beneath this run axially to the tube in order to ensure better mixing of the starting material streams. The inlet orifices below the lowest tangential inlet orifice are here preferably at such a small distance from the tangential inlet orifices that the spin generated by the tangential inlet orifices has still not yet disappeared owing to friction, and thus good mixing is produced by a turbulent flow, but back-mixing does not take place.

The turbulence necessary for the mixing should not lead to back-mixing, however. Therefore, the tubular cross section is preferably chosen rather small for a given throughput, in order to achieve a high convective flow velocity and thus avoid possible back-mixing.

The mixing chamber can, in addition, comprise in the downstream direction a post-mixing zone in which the turbulence necessary for good mixing can decay and/or the solidification reaction can even proceed to a certain extent.

Preferably, the liquid distributor comprises an outer liquid distributor body and an inner liquid distributor body pressed into the outer liquid distributor body and has N, if appropriate identical, nozzles, the outer liquid distributor body having an inlet channel connected to the mixing apparatus and a cavity exiting from this inlet channel, and the inner liquid distributor body pressed into the cavity of the outer liquid distributor body having, within the cavity, the same shape as the cavity of the outer liquid distributor body and, on the periphery of the inner liquid distributor or on the surface of the cavity, N grooves being distributed which extend from the upstream end of the cavity to the nozzles at the downstream end of the grooves, and the nozzles being situated either in the outer or inner liquid distributor body.

Owing to the fact that the inner liquid distributor body fits exactly into the cavity of the outer liquid distributor body and is pressed into this, it seals the liquid distributor, and the mixture can only flow through the grooves.

The advantage of this construction is that the grooves in the liquid distributor may be simply produced with high accuracy. In turn, the high accuracy can better ensure the uniformity of the partial streams.

If the grooves and the nozzles are situated in different liquid distributor bodies, it is essential to bring the nozzle inlets and the grooves into congruence very well, so that no obstacles to the flow result.

To avoid the occurrence of edges as far as possible, it is advantageous to join the outer liquid body and the mixing chamber to one another directly, or preferably to form them from one piece. If the mixing chamber is formed by a cylindrical tube, preferably, the diameters of the tube and inlet channel are identical and their axes parallel.

For the same reason, it is advantageous if the liquid distributor body which comprises the nozzles also comprises the grooves, i.e. from the grooves, suitable nozzle orifices lead out from the corresponding liquid distributor.

Preferably, the nozzles are situated in the inner liquid distributor body, since this does not have a cavity and is thus generally simpler to fabricate.

Preferably, for the same reason, the grooves are situated on the periphery of the inner liquid distributor body.

With a suitable shape of the inner liquid distributor body, in particular in the event that the grooves run in the outer liquid distributor body, the orifices of the grooves can serve as nozzles at their end.

Preferably, the inner liquid distributor body extends from the cavity out to the inlet channel and ends there tapering in the upstream direction, so that it already divides the liquid stream in the inlet channel. This can ensure a particularly uniform division of the mixed stream without back-mixing.

Preferably, the cavity in the outer liquid distributor body has a shape such that the outer liquid distributor body does not constrict in a downstream direction and the inner liquid distributor body can be pressed from the outside into the outer liquid distributor body, in some circumstances with rotation. In this case, it is particularly advantageous to form grooves and nozzles in the inner liquid distributor body. By means of this construction, the liquid distributor can be readily disassembled, e.g. for maintenance or for changing the droplet size.

In order to be able to divide the mixed stream as uniformly as possible and having identical residence times for the partial streams, the liquid distributor preferably has a rotational symmetry corresponding to the preset number N of the nozzles. More precisely, the cavity has a rotational symmetry about an axis of symmetry parallel to the direction of the inlet channel, so that by symmetry rotations, the positions of the nozzles can be converted into one another, and extends, starting from a surface perpendicular to the axis of symmetry, at the downstream end of the inlet channel along the axis of symmetry to the end of the body. In the case of N nozzles, the shape of the cavity can therefore result, for example, from successive rotation of a sector comprising a nozzle having an angle of 360°/N by multiples of 360°/N. The inner liquid distributor body pressed into the cavity of the outer liquid distributor body has the same symmetry as the cavity of the outer liquid distributor body and, in the part which is pressed into the cavity of the outer liquid distributor body, has the shape of the cavity, so that the inlet channel is correspondingly sealed. However, the inner liquid distributor body extends, tapering further in the upstream direction, into the inlet channel, in order firstly to divide the total stream flowing through the inlet channel, and secondly to avoid dead spaces. The grooves extend from the upstream end of the cavity to the nozzles and are preferably distributed in accordance with the symmetry.

Preferably, the grooves are distributed in equal intervals on the periphery of the inner liquid distributor body. The nozzles then preferably lead from the downstream end of the grooves beginning at a level between the outer boundary surface of the inner liquid distributor body and the upstream end of the cavity, to the outer boundary surface of the inner liquid distributor.

Owing to the high symmetry of the liquid distributor, all partial streams are equivalent and thus the flow conditions and residence times are essentially identical for all partial streams. This leads to a comparatively narrow total residence time distribution in the liquid distributor and thus to a very homogeneous product. The uniformity of the flow conditions in all nozzles leads to a narrow droplet radius distribution.

The nozzle orifices preferably end in a sharp edge which ensures the formation, and the detachment of, individual droplets having only a small scattering in the droplet radii.

Preferably, the inner liquid distributor body runs upstream in a point, in order to achieve good division of the stream coming from the inlet channel without back-mixing and the associated expansion in residence time distribution.

The cross-sectional area of the cavity preferably does not decrease on the entire length in the downstream direction, but only increases. Since the inner liquid distributor body then also tapers in the upstream direction, it can easily be pressed from below into the cavity of the outer liquid distributor body. It can thus be readily taken out of the liquid distributor for maintenance. Likewise, by exchanging the inner liquid distributor body without changing the mixing apparatus, the droplet size can be readily varied by installing a single different inner liquid distributor body having nozzles of a different diameter without modifications to the mixing chamber.

A further advantage of this construction is that the inner liquid distributor body is self-centering, if it is pressed into the outer liquid distributor body, which considerably simplifies exchange or replacement in a production plant.

Preferably, in this case, the inner liquid distributor body is pressed into the outer liquid distributor body by a retaining nut screwed onto the outer liquid distributor body. This type of fastening permits a simple but secure fastening of the inner liquid distributor body.

In one embodiment, the cross section of the cavity can be an equilateral N-sided polygon. In this case, the cavity preferably has the shape of a truncated pyramid. In order to ensure as uniform a liquid distribution as possible without dead spaces, the inner liquid distributor body then has the shape of a pyramid fitting into the truncated pyramid.

A circular cross section of the cavity is particularly expedient, since it may be particularly simply and precisely manufactured, the cavity shape preferred being a truncated cone which ends with the diameter of the inlet channel. In this case, because of the simple and precise manufacture, the inner liquid distributor body also preferably has the shape of a cone fitting into the truncated cone. This arrangement, owing to the very high symmetry, permits a simple and yet very precise manufacture and accordingly good uniformity of residence times and flow conditions in the channels.

The apparatuses can be made of any materials which have sufficient strength and, if appropriate, corrosion resistance. Thus, the material can be suitable steels, in particular stainless steels, glasses, plastics or fiber-reinforced plastics. It is also conceivable to fabricate the individual apparatus parts from different materials.

In order to avoid corrosion and/or adhesion of contaminants, the inner wall of the apparatus can be coated with suitable materials, such as enamel or nonstick coatings such as PTFE or PVDE.

In addition, if appropriate, in order to be able to control better the rate of solidification, the temperature of the apparatus can be controlled by cooling or heating. For this purpose, the nozzle can either be provided with a heating or cooling jacket or can be equipped with heating or cooling channels.

For high throughputs, the apparatus can also be constructed in such a manner that a plurality of liquid distributors according to the invention are connected in series in a cascade, in all liquid distributors except for the liquid distributors of the last cascade stage in the downstream direction, the nozzles being replaced by suitable channels and being connected to the inlet channels of the following liquid distributors. The number of the stages which can be used is only limited by the fact that the sum of the residence times in the mixing chamber and the individual liquid distributors must be less than the solidification time.

Preferably, the apparatus is used for preparing gels. In this case, care must be taken to ensure that the sequence of feeding the reactants is selected in such a manner that no solid constituents can form. If, for example, the gel formation is initiated by a change in pH, the pH-changing liquid should not be added last, since it can then be metered in at a relatively high local concentration and there is the risk that premature gel formation can thus occur. Feed in the reverse sequence does not have this risk. Particular preference here is given to the preparation of $SiO_2$-gels, preferably $SiO_2$-hydrogels from water glass. The nozzle can also be used for atomizing a starting material stream, for example a dispersion, solution or melt. The use of a mixing section is not necessary for this.

The invention therefore likewise relates to an apparatus for atomizing a starting material stream, wherein the apparatus comprises a liquid distributor 1',7 and N droplet-forming nozzles 9a, 9b, . . . connected to the liquid distributor 1',7 and wherein the liquid distributor 1', 7 and the N nozzles 9a, 9b, . . . are disposed and arranged in such a manner that the starting material stream is essentially distributed without back-mixing or dead spaces in the flow squally over the N nozzles so that the residence times of the N partial streams in the liquid distributor 1',7 are essentially identical.

Two embodiments of the apparatus according to the invention are depicted in the figures and are described in more detail below.

Figure 2:
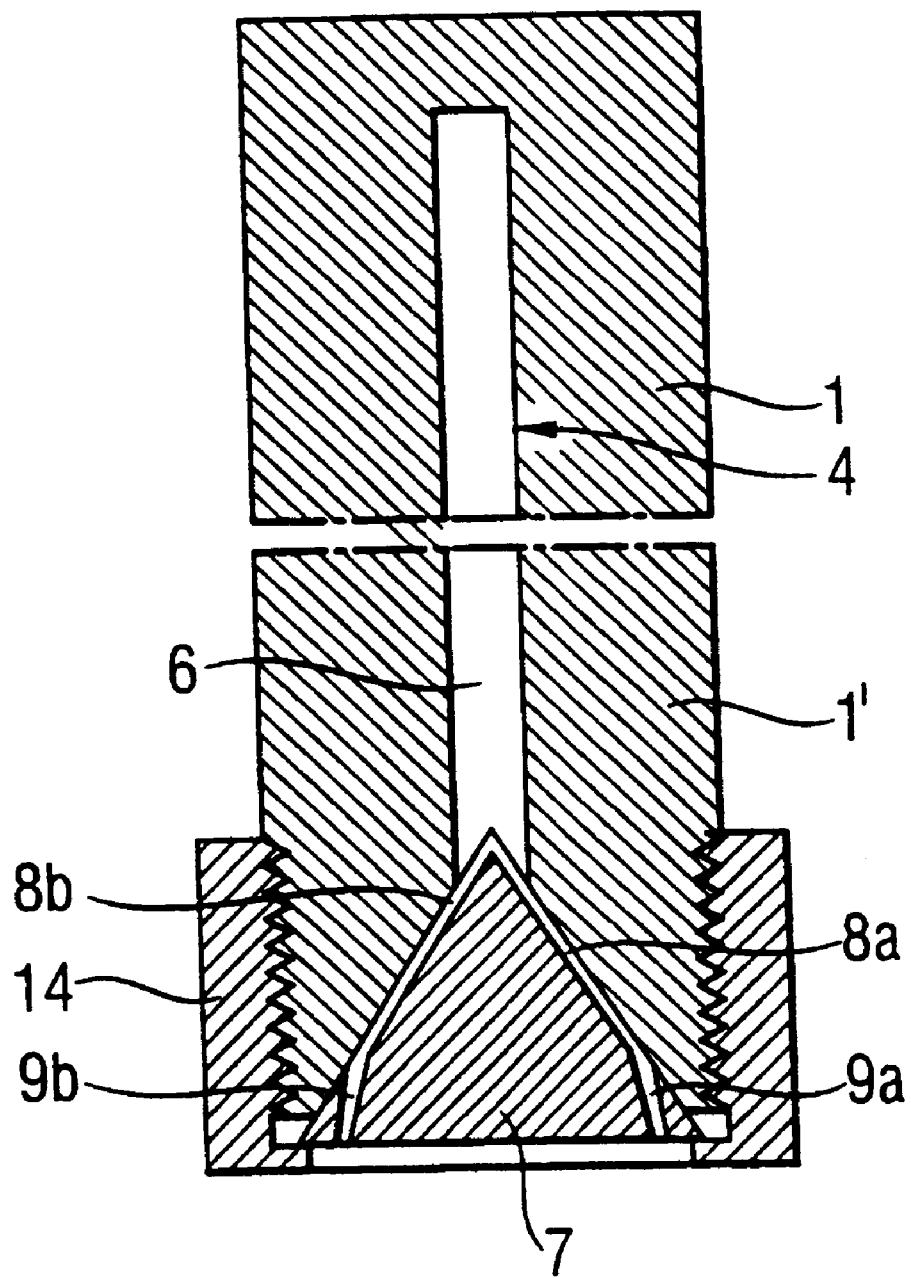
Figure 3:
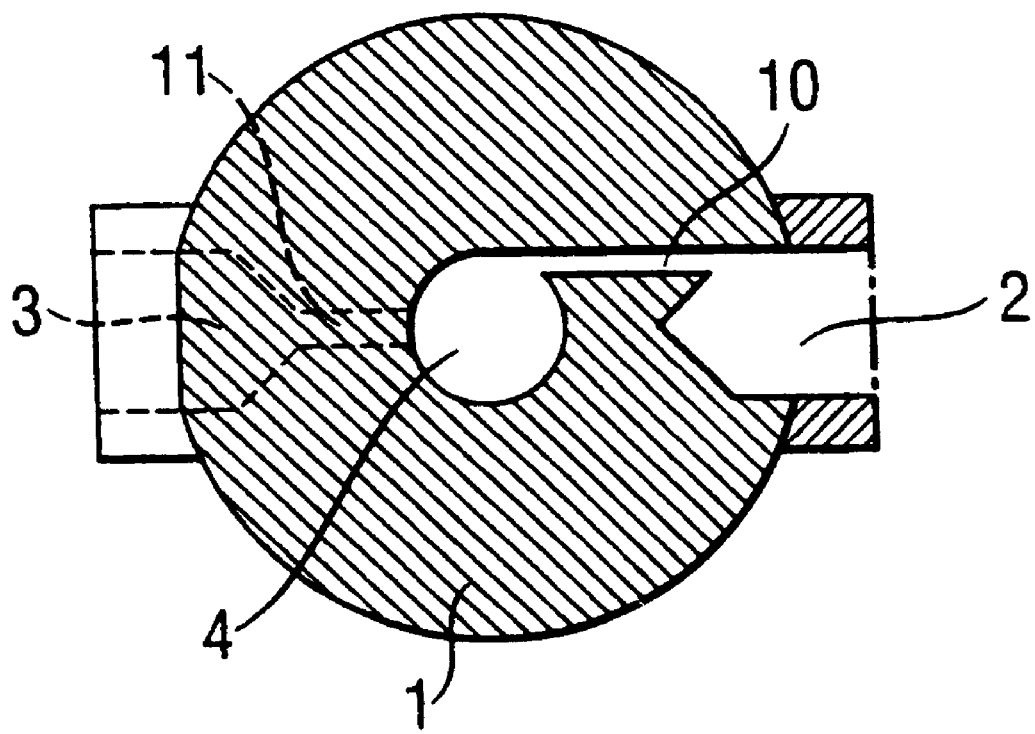
Figure 4:
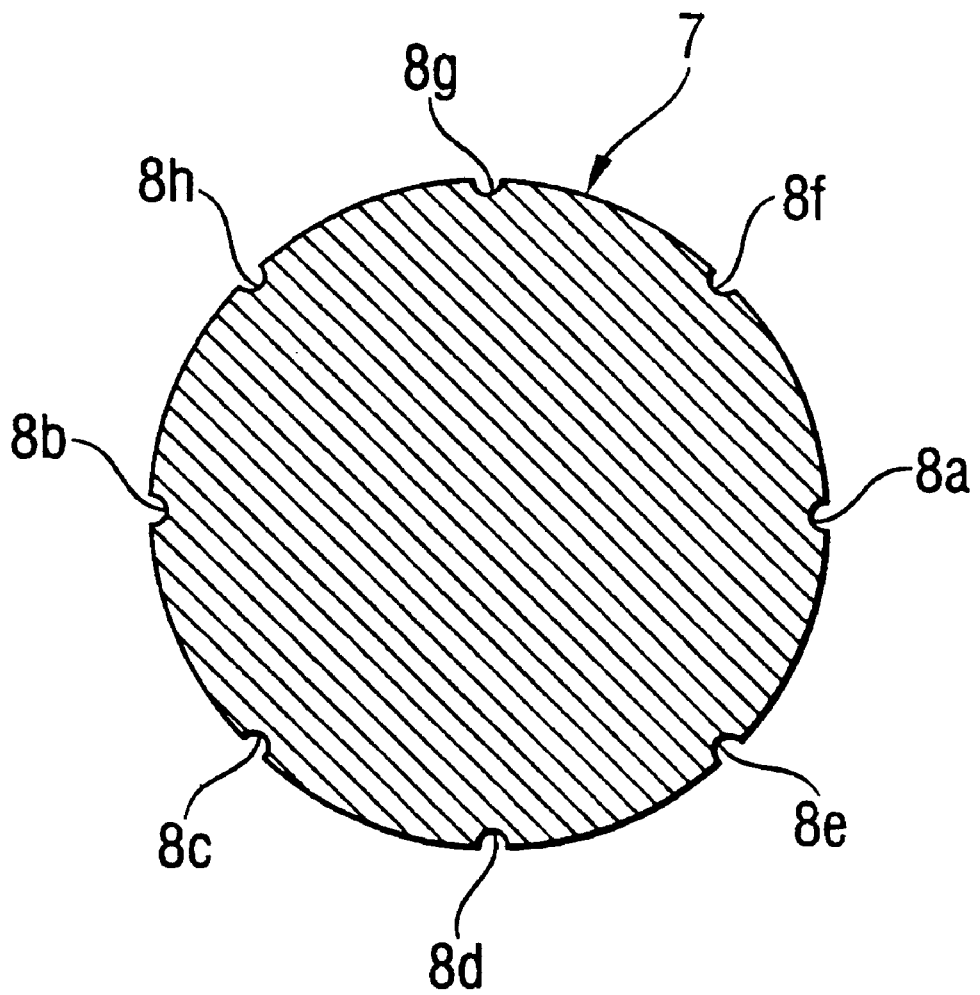

In the drawings,

FIG. 1 shows a longitudinal section through a first mixing-spraying apparatus according to the present invention, FIG. 2 shows a further longitudinal section through the mixing-spraying apparatus from FIG. 1, FIG. 3 shows a cross section through the apparatus in FIG. 1 at the level of the upper tube inlet, FIG. 4 shows a cross section through the inner liquid distributor body of the apparatus in FIG. 1, FIG. 4a is a perspective view of the inner liquid distributor body including exterior grooves 8a through 8n.

Figure 5:
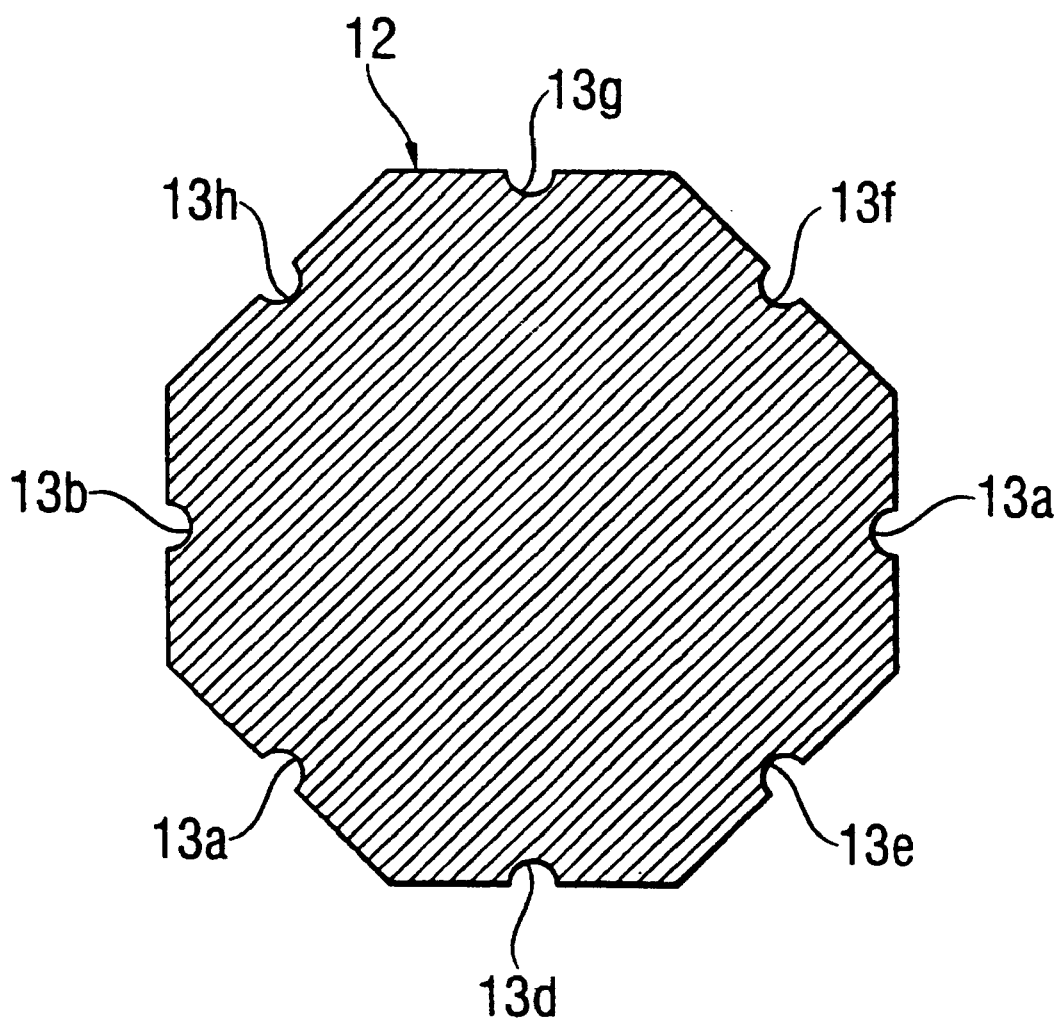

FIG. 5 shows a cross section through the inner liquid distributor body of a second embodiment according to the present invention and FIG. 6 shows the second embodiment of FIG. 5.

In FIG. 1, an outer cylindrical shell 1 is provided with two tube inlets 2 and 3 displaced over its length. Through these pipes, the components which form the mixture are brought via channels 10 and 11 into the mixing chamber 4 which is constructed coaxially in the shell and is sealed on its end 5.

FIG. 3 shows a cross section through the apparatus on the level of the mixing chamber 4. The upper tube inlet 2 introduces via a tangential channel 10 the first component tangentially into the mixing compartment 4, so that the component introduced by it flows with spin into the mixing chamber. Beneath this, shown as a dashed line, the second component is added axially via the tube inlet 3 and a channel 11 and is very well mixed with the first component in particular due to the spin of the first component.

As shown in FIG. 1, the mixture is fed from the exit of the mixing chamber 4, which converts directly into the inlet channel 6 of the liquid distributor, to the liquid distributor. The cavity of the outer liquid-distributor, 1' forms a truncated cone whose upstream end ends in the inlet channel 6. The inner liquid distributor body 7 is formed by a fitting cone whose upper end extends into the inlet channel 6. The inner liquid distributor body 7 is pressed into the outer liquid distributor body 1' by a retaining nut 14 which is screwed onto the outer liquid distributor body 1'. By this means, the mixture fed via the inlet channel 6 is divided into equal partial streams.

FIG. 2 shows a further longitudinal section through the apparatus which comprises grooves 8a and 8b which run in the periphery of the inner liquid distributor body 7. The grooves 8a and 8b end in identical nozzles 9a and 9b which form the mixture into droplets. In this view, the inlet channels cannot be seen, since they are situated in a different sectional plane.

FIG. 4 shows a cross section through the inner liquid distributor body at a level above the nozzles. In addition to the grooves 8*a* and 8*b*, in this example six further grooves 8*c* to 8*h* are additionally introduced on the periphery. They open into corresponding nozzles, which are not shown, in a similar manner to the disposition of the nozzles 9*a* and 9*b*. The grooves pass on the partial streams to the corresponding nozzles, where, after the same residence time with the same flow conditions, they are atomized to form droplets.

FIG. 5 shows the cross section of a second embodiment according to the present invention, in which the cross section of the cavity and thus of the inner liquid distributor body 12 forms a regular octagon. The grooves 13*a*–13*h* cross the centers of the sides of the inner liquid distributor body. The inner liquid distributor body itself has a pyramidal shape.

EXAMPLE 1

To prepare droplet-shaped $SiO_2$-hydrogels, a mixing nozzle according to the first embodiment is used. The diameter of the mixing chamber is 3 mm, and the length of the mixing chamber including the liquid distributor is 100 mm. The first tangential inlet borehole has a diameter of 1 mm, just like the second, central borehole. The vertical distance between the two inlet boreholes is 3 mm. The liquid distributor splits the mixture into 10 partial streams. The grooves are distributed uniformly at the periphery and each open into outlet orifices having a diameter of 0.6 mm. The throughput of the mixing chamber is 60 l/h. The mixture exiting from the mixing chamber is split into equal partial streams, fed to the nozzles and atomized in air in a falling tower. The components to be mixed which are used are, in a volumetric ratio 1:1, firstly a 5.51% hydrochloric acid and secondly a 16.03% sodium water glass solution having an $Na_2O:SiO_2$ ratio of 1:3.3. The starting materials are transported at room temperature into the mixing chamber, the hydrochloric acid: stream entering through: the upper, tangential borehole, and the water glass stream entering through the lower, central borehole. Of the parameters listed, the apparatus developed has a Reynolds number of 7000 to 7500 within the mixing chamber and 3500 to 4000 in the liquid distributor. After it leaves the apparatus, the mixture requires a further 4.5 seconds until complete gelling has occurred. The apparatus can be operated for days without blockage or other interferences. The particle size distribution was determined after wet screening. Based on the gel passing through, the $d_{10}$-value is approximately 1000 to 1100 $\mu$m, the $d_{50}$-value is 1250 to 1350 $\mu$m and the $d_{90}$-value is 1500 to 1600 $\mu$m.

What is claimed is:

1. Apparatus for preparing a rapidly solidifying mixture from a plurality of liquid components and subsequent atomization of the solidifying mixture comprising a mixing chamber (4), the liquids to be mixed being able to be fed separately to the mixing chamber (4) and the mixing chamber (4) having essentially no back-mixing in the areas in which reactions can occur or having essentially no dead spaces in the flow in the areas, wherein the apparatus comprises a liquid distributor (1', 7) and N droplet-forming nozzles (9*a*,9*b*, . . . ) which are connected to the liquid distributor (1', 7), and wherein the liquid distributor (1', 7) is connected to the mixing chamber (4) and distributes the mixed stream coming from the mixing chamber (4) equally over the nozzles (9*a*, 9*b*, . . . ) essentially without back-mixing or dead spaces in the flow, so that the residence times of the partial streams in the liquid distributor (1',7) are essentially identical.

2. The apparatus as claimed in claim 1, wherein the mixing chamber (4) is formed by a cylindrical tube (1) having at least two inlet orifices (10, 11) displaced over its length, which cylindrical tube is sealed at its upstream end (5).

3. The apparatus as claimed in claim 2, wherein the at least two inlet orifices include an upper inlet orifice (10) which runs tangentially to the tube wall and a lower inlet orifices (11) which runs axially to the tube.

4. The apparatus as claimed in claim 1, wherein the liquid distributor (1',7) has an outer liquid distributor body (1') and an inner liquid distributor body (7) pressed into the outer liquid distributor body and has N nozzles (9*a*, 9*b*, . . . ), and wherein the outer liquid distributor body has an inlet channel (6) connected to the mixing chamber and a cavity exiting from this inlet channel (6), and wherein the inner liquid distributor body (7) pressed into the cavity of the outer liquid distributor body has, within the cavity, the same shape as the cavity of the outer liquid distributor body (1'), and wherein, on the periphery of the inner liquid distributor body (7) or on the surface of the cavity, N grooves (8*a*–8*h*) are distributed with extend from the upstream end of the cavity to the nozzles (9*a*, 9*b*, . . . ) at the downstream end of the grooves (8*a*–8*h*), and wherein the nozzles (9*a*, 9*b*, . . . ) are situated either in the outer or inner liquid distributor body.

5. The apparatus as claimed in claim 1, wherein the nozzles (9*a*,9*b*, . . . ) are identical and wherein the flow properties of the partial streams are essentially identical at the nozzles (9*a*,9*b*, . . . ).

6. The apparatus as claimed in claim 4, wherein the grooves (8*a*–8*h*) are situated on the surface of the inner liquid distributor (7).

7. The apparatus as claimed in claim 4, wherein the cylindrical tube (1) and the outer liquid distributor body (1') are fabricated from one piece.

8. The apparatus as claimed in claim 4, wherein the inner liquid distributor body (7) comprises the nozzles (9*a*, 9*b*, . . . ).

9. The apparatus as claimed in claim 4, wherein the inner liquid distributor body (7) continues in an upstream direction tapering into the inlet channel (6).

10. The apparatus as claimed in claim 4 wherein the cavity is shaped in such a manner that the inner liquid distributor body (7) can be pressed or rotated into the outer liquid distributor body (1').

11. The apparatus as claimed in claim 4, wherein the cavity has a rotational symmetry about an axis of symmetry parallel to the direction of the inlet channel (6), so that by symmetry rotations, the positions of the nozzles (9*a*, 9b, . . . ) are convertible into one another, and extends, starting from a surface perpendicular to the axis of symmetry at the downstream end of the inlet channel (6) along the axis of symmetry to the end of the body (1'), and wherein the inner liquid distributor body (7) pressed into the cavity of the outer liquid distributor body (1') has the same symmetry as the cavity of the outer liquid distributor body (1'), and, in the part which is pressed into the cavity of the outer liquid distributor body (1'), has the shape of the cavity and continues further into the inlet channel (6) tapering in an upstream direction, and wherein the grooves (8a–8h) are distributed in accordance with the symmetry.

12. The apparatus as claimed in claim 2, wherein the mixing chamber (4) has the same diameter as the inlet channel (6) of the liquid distributor (1',7) and is directly joined to this, and wherein the axis of the mixing chamber (4) is parallel to the axis of the inlet channel (6).

13. The apparatus as claimed in claim 4, wherein the cross-sectional area of the cavity remains the same or increases over the entire length in a downstream direction.

14. The apparatus as claimed in claim 4, wherein the inner liquid distributor body (7) runs out in a point upstream.

15. The apparatus as claimed in claim 4, wherein the nozzles (9a,9b, . . . ) are shaped and orientated in such a manner that the flight path of the droplets directly downstream of the nozzles (9a,9b, . . . ) does not run on the axis of symmetry.

16. The apparatus as claimed in claim 4, wherein the nozzles (9a,9b, . . . ) are formed in such a manner that grooves (8a–8h) extend as far as the downstream end of the cavity and the orifices of the grooves (8a–8h) end with a sharp edge.

17. The apparatus as claimed in claim 4, wherein the cross section of the cavity is circular.

18. The apparatus as claimed in claim 17, wherein the cavity is a truncated cone.

19. The apparatus as claimed in claim 17, wherein the envelope of the inner liquid distributor body (7) is a cone and the grooves (8a–8h) run in an axial direction on the cone shell.

20. The apparatus as claimed in claim 4, wherein the cross section of the cavity is an equilateral N-sided polygon, where N is the number of nozzles (9a, 9b, . . . ), and wherein the grooves (13a–13h) cut the sides of the N-sided polygon.

21. The apparatus as claimed in claim 20, wherein the cavity is a truncated pyramid having an equilateral N-sided polygon as base.

22. The apparatus as claimed in claim 20, wherein the inner liquid distributor body (12) is a pyramid except for the grooves.

23. The apparatus as claimed in claim 4, wherein the inner liquid distributor body (7) is pressed into the outer liquid distributor body by a retaining nut (14) screwed onto the outer liquid distributor body (1').

24. The apparatus as claimed in claim 4, wherein a plurality of liquid distributors are connected in series in a cascade, and wherein, in all liquid distributors except for the liquid distributors of the last cascade stage in the downstream direction, the nozzles (9a,9b, . . . ) are replaced by channels and are connected to the inlet channels of the following liquid distributors.

* * * * *